US012221005B2

(12) United States Patent
Sugimoto et al.

(10) Patent No.: US 12,221,005 B2
(45) Date of Patent: Feb. 11, 2025

(54) SYSTEM FOR ESTIMATING REQUIRED BATTERY POWER FOR MOVING BODIES

(71) Applicant: TOYOTA JIDOSHA KABUSHIKI KAISHA, Toyota (JP)

(72) Inventors: Kazuhiro Sugimoto, Ashigarakami-gun (JP); Kotoru Sato, Susono (JP); Kumiko Katsumata, Susono (JP); Shun Ota, Susono (JP); Takahiro Suzuki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 561 days.

(21) Appl. No.: 17/396,838

(22) Filed: Aug. 9, 2021

(65) Prior Publication Data

US 2022/0111739 A1 Apr. 14, 2022

(30) Foreign Application Priority Data

Oct. 14, 2020 (JP) .................... 2020-173204

(51) Int. Cl.
| | |
|---|---|
| *B60L 53/68* | (2019.01) |
| *B60L 53/67* | (2019.01) |
| *B60L 58/13* | (2019.01) |
| *H02J 7/00* | (2006.01) |

(52) U.S. Cl.
CPC .............. *B60L 53/68* (2019.02); *B60L 53/67* (2019.02); *B60L 58/13* (2019.02); *H02J 7/007* (2013.01); *B60L 2240/68* (2013.01); *B60L 2240/72* (2013.01); *B60L 2260/52* (2013.01); *B60L 2260/54* (2013.01)

(58) Field of Classification Search
CPC .......... B60L 53/68; B60L 53/67; B60L 58/13; B60L 2240/68; B60L 2240/72; B60L 2260/52; B60L 2260/54
USPC ....................................................... 320/109
See application file for complete search history.

(56) References Cited

U.S. PATENT DOCUMENTS

| | | | |
|---|---|---|---|
| 8,996,213 B2 | 3/2015 | Ishikawa et al. | |
| 11,966,861 B2 * | 4/2024 | Nagata | G06Q 10/02 |
| 2013/0079962 A1 * | 3/2013 | Ishikawa | B60L 15/2045 |
| | | | 701/22 |

(Continued)

FOREIGN PATENT DOCUMENTS

| | | |
|---|---|---|
| JP | 2013-69226 A | 4/2013 |
| JP | 2013-070515 A | 4/2013 |

(Continued)

*Primary Examiner* — Richard Isla
*Assistant Examiner* — Manuel Hernandez
(74) *Attorney, Agent, or Firm* — Finnegan, Henderson, Farabow, Garrett and Dunner, LLP (57) ABSTRACT

A server 40 includes a control unit 47, and the control unit 47 acquires respective planned use positions of plural users, respective destinations of the plural users, and remaining battery levels of rechargeable batteries of moving bodies which the plural users are scheduled to use, estimates, for each of the moving bodies, a required power amount of the battery based on the planned use position and the destination, determines, for each of the moving bodies, whether the remaining battery level is equal to or greater than the required power amount, and dispatches the moving body whose remaining battery level is equal to or greater than the required power amount to the planned use position.

11 Claims, 8 Drawing Sheets

(56) References Cited

U.S. PATENT DOCUMENTS

| | | | |
|---|---|---|---|
| 2014/0005848 A1* | 1/2014 | Melen | G06Q 10/06311 |
| | | | 700/291 |
| 2017/0050527 A1* | 2/2017 | Tsuchiya | B60L 53/62 |
| 2018/0272878 A1* | 9/2018 | Lee | B60L 53/665 |
| 2019/0285425 A1* | 9/2019 | Ludwick | G08G 1/202 |
| 2019/0294173 A1* | 9/2019 | Szubbocsev | B60W 60/0023 |
| 2020/0104965 A1 | 4/2020 | Ramot et al. | |
| 2020/0262307 A1* | 8/2020 | Rosene | H04L 67/52 |
| 2021/0138928 A1* | 5/2021 | O'Gorman | B60L 50/50 |
| 2021/0241626 A1* | 8/2021 | Nishimura | G08G 1/202 |
| 2024/0045444 A1* | 2/2024 | Ware | G01C 21/206 |

FOREIGN PATENT DOCUMENTS

| | | | |
|---|---|---|---|
| JP | 2020-522789 A | | 7/2020 |
| JP | 2021033827 A | * | 3/2021 |

* cited by examiner

SYSTEM FOR ESTIMATING REQUIRED BATTERY POWER FOR MOVING BODIES

CROSS-REFERENCE TO RELATED APPLICATION(S)

The present application claims priority to and incorporates by reference the entire contents of Japanese Patent Application No. 2020-173204 filed in Japan on Oct. 14, 2020.

BACKGROUND

The present disclosure relates to a server, a charging system, and a program.

Japanese Laid-open Patent Publication No. 2013-70515 discloses a technique for predicting a required power amount of a battery needed for a moving body such as an electric vehicle to travel on a planned travelling route to a destination.

SUMMARY

There is a need for providing a server, a charging system, and a recording medium storing a program capable of efficiently charging a plurality of moving bodies.

According to an embodiment, a server includes a processor configured to: acquire respective planned use positions of plural users, respective destinations of the plural users, and remaining battery levels of rechargeable batteries of moving bodies which the plural users are scheduled to use, estimate, for each of the moving bodies, a required power amount of the battery based on the planned use position and the destination, determine, for each of the moving bodies, whether the remaining battery level is equal to or greater than the required power amount, and dispatch the moving body whose remaining battery level is equal to or greater than the required power amount to the planned use position.

According to an embodiment, a charging system includes: a plurality of moving bodies each including a rechargeable battery; and a server having a processor configured to: acquire respective planned use positions of plural users, respective destinations of the plural users, and remaining battery levels of the batteries of the plurality of moving bodies which the plural users are scheduled to use, estimate, for each of the moving bodies, a required power amount of the battery based on the planned use position and the destination, determine, for each of the moving bodies, whether the remaining battery level is equal to or greater than the required power amount, and dispatch the moving body whose remaining battery level is equal to or greater than the required power amount to the planned use position.

According to an embodiment, a non-transitory computer-readable recording medium storing a program for causing a processor to: acquire respective planned use positions of plural users, respective destinations of the plural users, and remaining battery levels of rechargeable batteries of moving bodies which the plural users are scheduled to use, estimate, for each of the moving bodies, a required power amount of the battery based on the planned use position and the destination, determine, for each of the moving bodies, whether the remaining battery level is equal to or greater than the required power amount, and dispatch the moving body whose remaining battery level is equal to or greater than the required power amount to the planned use position.

DETAILED DESCRIPTION

In the related art, Japanese Laid-open Patent Publication No. 2013-70515 does not consider efficiently charging each of a plurality of moving bodies such as unowned vehicles, for example, for carsharing in a charging facility with a required power amount. Further, the number of moving bodies that can be charged in a charging facility is limited, and in a case where a plurality of moving bodies are charged, it is difficult to always keep a required power amount for all the moving bodies, and there is room for improvement.

Hereinafter, a charging system according to embodiments of the present disclosure will be described with reference to the drawings. The present disclosure is not limited by the following embodiments. In the following description, identical parts are given identical reference signs.

Overview of Charging System

Figure 1:
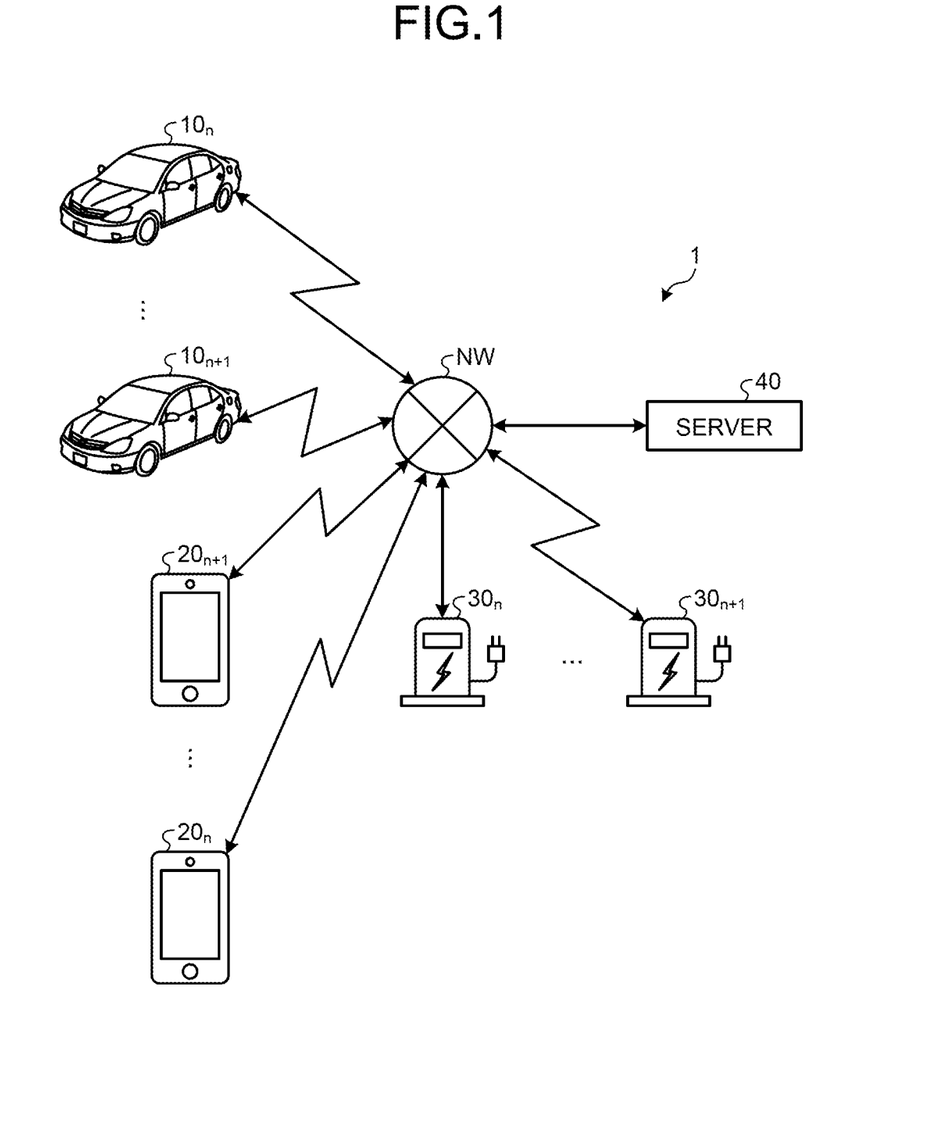
FIG. 1 is a diagram schematically illustrating a configuration of a charging system according to an embodiment.

FIG. 1 is a diagram schematically illustrating a configuration of a charging system according to a first embodiment. A charging system 1 illustrated in FIG. includes moving bodies $10_n \ldots 10_{n+1}$ (n is an integer of 1 or more), communication terminals $20_n \ldots 20_{n+1}$, charging devices $30_n \ldots 30_{n+1}$, and a server 40. The charging system 1 is configured such that these members can communicate with each other through a network NW. This network NW is, for example, an Internet network, a mobile phone network, or the like.

Functional Configuration of Moving Body

Figure 2:
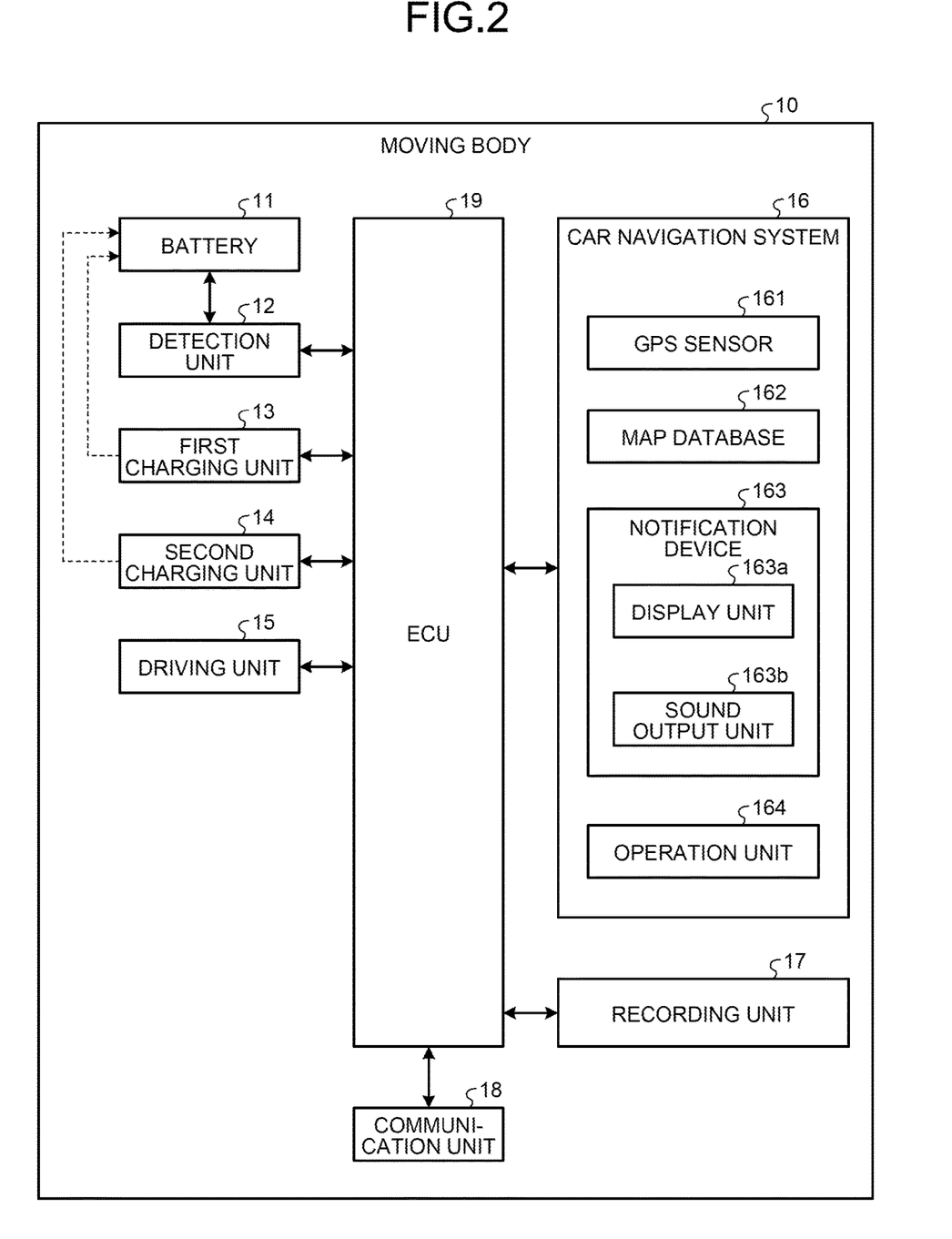
FIG. 2 is a block diagram illustrating a functional configuration of a moving body according to the embodiment.

First, a functional configuration of the moving bodies $10_n \ldots _{n+1}$ will be described. The moving bodies $10_n \ldots _{n+1}$ have functional configurations similar to each other. Therefore, any one of the moving bodies $10_n \ldots _{n+1}$ is hereinafter referred to as a moving body 10. FIG. 2 is a block diagram illustrating a functional configuration of the moving body 10.

The moving body 10 illustrated in FIG. 2 includes a battery 11, a detection unit 12, a first charging unit 13, a second charging unit 14, a driving unit 15, a car navigation system 16, a recording unit 17, a communication unit 18, and an electronic control unit (ECU) 19. Although a vehicle such as an electric vehicle (EV), a plug-in hybrid vehicle (PHV), or a fuel cell electric vehicle (FCEV) is described as the moving body 10 in the following description, the moving body 10 is not limited to this and can be, for example, a motorcycle equipped with a motor and a battery, an electric two-wheeled vehicle such as a bicycle or a kickboard, a three-wheeled vehicle, a bus, a truck, a ship, or a drone.

Further, the moving body 10 automatically moves toward a destination under control of the server 40. Of course, a user using the moving body 10 (user in the moving body 10) can move the moving body 10 toward a destination desired by the user by operating members such as a steering.

The battery 11 is, for example, a rechargeable secondary battery such as a nickel metal hydride battery or a lithium ion battery. The battery 11 stores high-voltage DC power for driving the moving body 10.

The detection unit 12 detects a remaining battery level (SOC), a temperature, a state of health (SOH), a voltage value, and a current value of the battery 11, and outputs a detection result to the ECU 19. The detection unit 12 is constituted by various battery sensors, a temperature sensor, and the like.

The first charging unit 13 is electrically connected to the battery 11 and is electrically connectable to the charging device 30 described later via a charging port. The first charging unit 13 converts (transforms) an alternating current supplied from the charging device 30 (electric power supplied by a normal AC charging method) into a voltage and electric power with which the battery 11 can be charged and outputs the alternating current. The first charging unit 13 is constituted by an AC/DC converter, a DC/DC converter, and the like.

The second charging unit 14 is electrically connected to the battery 11 and is electrically connectable to the charging device 30 via the charging port. The second charging unit 14 converts (transforms) a direct current supplied from the charging device 30 (electric power supplied by a quick DC charging method) into a voltage and electric power with which the battery 11 can be charged and outputs the direct current. The first charging unit 13 is constituted by a DC/DC converter, a rectifier circuit, and the like.

The driving unit 15 supplies a driving force to drive wheels of the moving body 10 based on electric power supplied from the battery 11 under control of the ECU 19. The driving unit 15 is constituted by a motor and the like.

The car navigation system 16 includes a global positioning system (GPS) sensor 161, a map database 162, a notification device 163, and an operation unit 164.

The GPS sensor 161 receives signals from a plurality of GPS satellites or transmitting antennas, and calculates a position (longitude and latitude) of the moving body 10 based on the received signals. The GPS sensor 161 is constituted by a GPS receiving sensor and the like. In the embodiment, orientation accuracy of the moving body 10 may be improved by mounting a plurality of GPS sensors 161.

The map database 162 records various map data. The map database 162 is constituted by a recording medium such as a hard disk drive (HDD) or a solid state drive (SSD).

The notification device 163 includes a display unit 163a for displaying an image, a map, video, and character information and a sound output unit 163b for generating sounds such as voice and alarm sound. The display unit 163a is a display such as a liquid crystal display or an organic electro luminescence (EL) display. The sound output unit 163b is a speaker or the like.

The operation unit 164 receives user's operation input and outputs signals corresponding to various received operations to the ECU 19. The operation unit 164 is realized by using a touch panel, buttons, switches, a jog dial, and the like.

The car navigation system 16 configured in this way superimposes a current position of the moving body 10 acquired by the GPS sensor 161 on a map corresponding to the map data recorded in the map database 162 and thereby notifies a user of information including a road on which the moving body 10 is currently travelling, a route to a destination, and the like by the display unit 163a and the sound output unit 163b.

The recording unit 17 records various kinds of information about the moving body 10. The recording unit 17 records, for example, CAN data of the moving body 10 input from the ECU 19 and various programs executed by the ECU 19. The recording unit 17 is constituted by a dynamic random access memory (DRAM), a read only memory (ROM), a flash memory, a hard disk drive (HDD), a solid state drive (SSD), or the like.

The communication unit 18 transmits CAN data and the like to the server 40 through the network NW under control of the ECU 19. The CAN data includes a remaining battery level (SOC) of the battery 11, SOH, and the like. The communication unit 18 is constituted by a communication module or the like capable of transmitting and receiving various kinds of information.

The ECU 19 is constituted by a memory and a processor having hardware such as a central processing unit (CPU). The ECU 19 controls each unit of the moving body 10. The ECU 19 moves the moving body 10 to the charging device 30 or a predetermined place by controlling the driving unit 15 based on a signal and an instruction transmitted from the server 40 via the communication unit 18, the position of the moving body 10 detected by the car navigation system 16, and the like.

Functional Configuration of Communication Terminal

Figure 3:
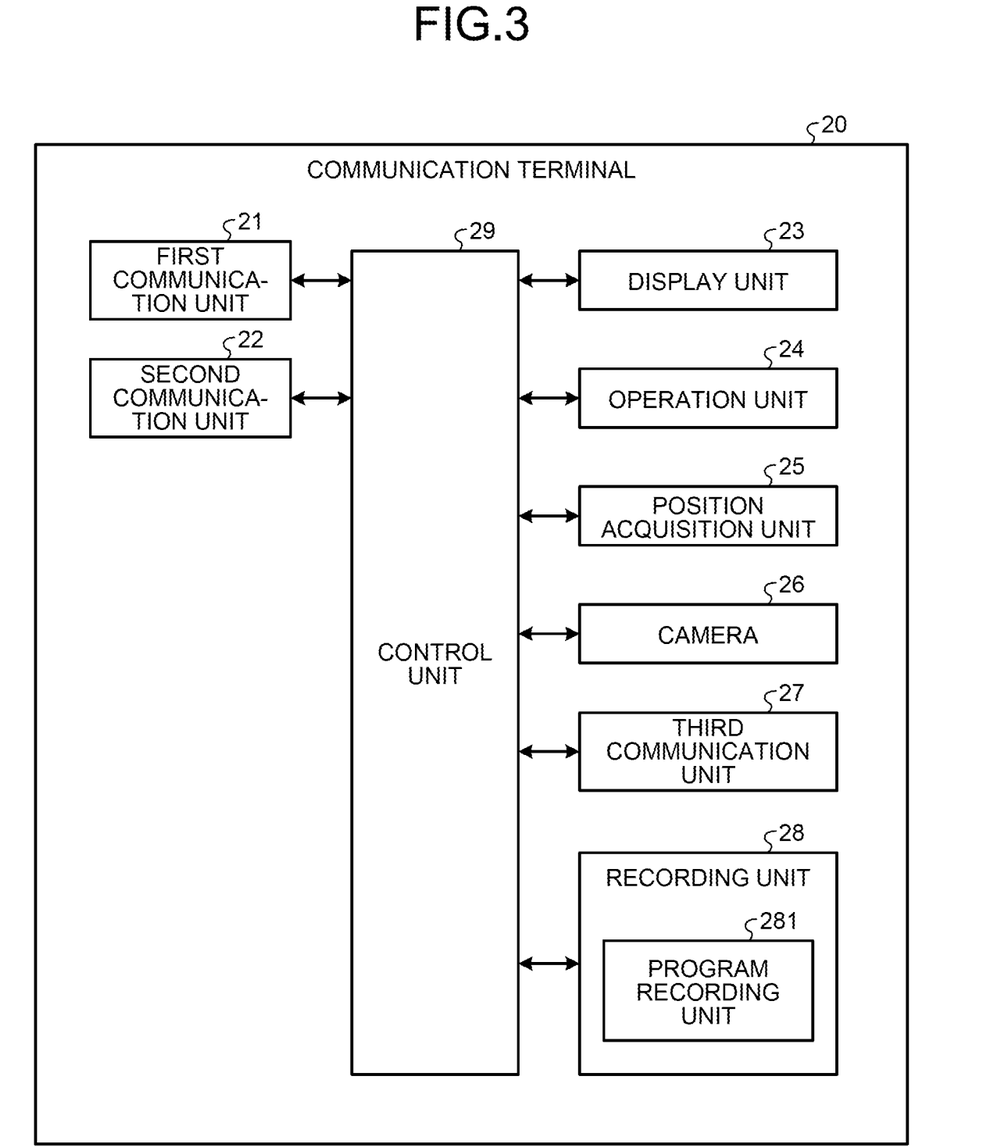
FIG. 3 is a block diagram illustrating a functional configuration of a communication terminal according to the embodiment.

Next, a functional configuration of the communication terminals $20_n \ldots 20_{n+1}$ will be described. The communication terminals $20_n \ldots _{n+1}$ have functional configurations similar to each other. Therefore, hereinafter, any one of the communication terminals $20_n \ldots 20_{n+1}$ is referred to simply as the communication terminal 20. FIG. 3 is a block diagram illustrating the functional configuration of the communication terminal 20.

The communication terminal 20 illustrated in FIG. 3 includes a first communication unit 21, a second communication unit 22, a display unit 23, an operation unit 24, a position acquisition unit 25, a camera 26, a third communication unit 27, a recording unit 28, and a control unit 29. Although it is assumed that the communication terminal 20 is a mobile phone in the following description, this is not restrictive, and the communication terminal 20 can be, for example, a tablet terminal or a wearable terminal.

The first communication unit 21 receives various kinds of information from the moving body 10 under control of the control unit 29 and outputs the received various kinds of information to the control unit 29. The first communication unit 21 is, for example, a communication module that supports Bluetooth (registered trademark) or the like.

The second communication unit 22 receives various kinds of information from the moving body 10 under control of the control unit 29 and outputs the received various kinds of information to the control unit 29. The second communication unit 22 is a communication module that supports Wi-Fi (registered trademark) or the like.

The display unit 23 displays various kinds of information under control of the control unit 29. The display unit 23 is a display panel such as a liquid crystal display or an organic electro luminescence (EL) display.

The operation unit 24 receives entry of various user's operations and outputs signals corresponding to the received various operations to the control unit 29. The operation unit 24 is constituted by a touch panel, switches, buttons, and the like.

The position acquisition unit 25 acquires a position of the communication terminal 20 and outputs the acquired position to the control unit 29. The position acquisition unit 25 is realized, for example, by using a plurality of GPS receiving sensors.

The camera 26 generates image data by photographing a subject under control of the control unit 29 and outputs this image data to the control unit 29. The camera 26 is realized by one or more optical systems and a charge coupled device (CCD) or complementary metal oxide semiconductor (CMOS) image sensor that generates image data by capturing an image of a subject imaged by the optical systems.

The third communication unit 27 transmits destination information on a destination set by using the operation unit 24 by the user through communication with the server 40 over the network NW under control of the control unit 29. The third communication unit 27 is a communication module that supports communication standards using a mobile phone line such as a 4th generation mobile communication system (4G) and a 5th generation mobile communication system (5G).

The recording unit 28 records various kinds of information about the communication terminal 20 and various programs executed by the communication terminal 20. The recording unit 28 is realized by a DRAM, a ROM, a flash memory, an SSD, a memory card, or the like.

The control unit 29 is constituted by a memory and a processor having hardware such as a CPU. The control unit 29 controls each unit of the communication terminal 20. In one embodiment, the control unit 29 functions as a first processor.

Functional Configuration of Charging Device

Figure 4:
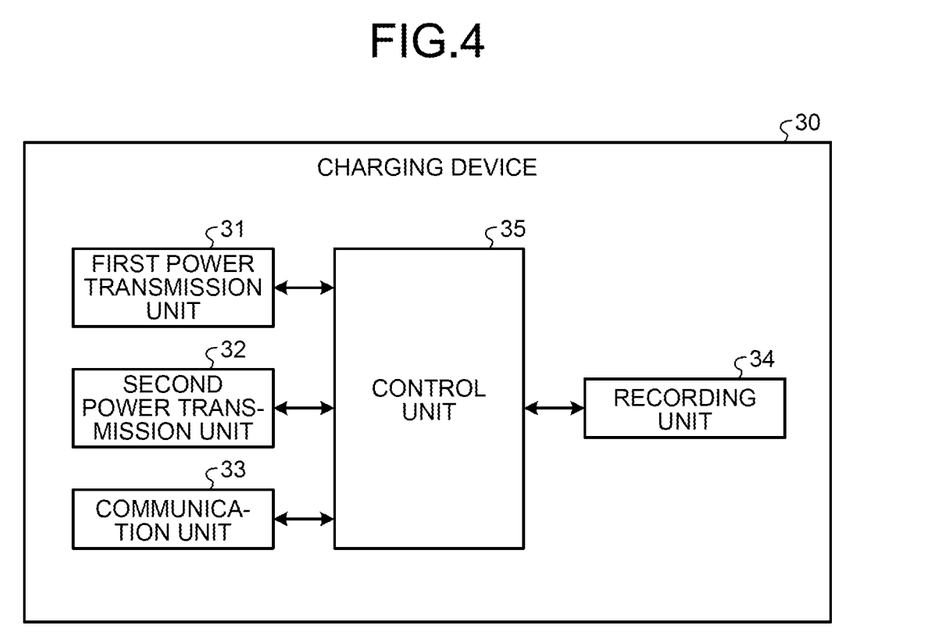
FIG. 4 is a block diagram illustrating a functional configuration of a charging device according to the embodiment.

Next, a functional configuration of the charging devices $30_n \ldots 30_{n+1}$ will be described. The charging devices $30_n \ldots 30_{n+1}$ have functional configurations similar to each other. Therefore, hereinafter, any one of the charging devices $30_n \ldots 30_{n+1}$ is referred to simply as the charging device 30. FIG. 4 is a block diagram illustrating the functional configuration of the charging device 30. At least one charging device 30 is installed in a charging facility.

The charging device 30 illustrated in FIG. 4 includes a first power transmission unit 31, a second power transmission unit 32, a communication unit 33, a recording unit 34, and a control unit 35.

The first power transmission unit 31 is connected to the first charging unit 13 of the moving body 10 and converts an alternating current of a predetermined voltage value (for example, 6600 V) supplied from an external AC power source into a direct current of a predetermined voltage value (for example, 200 V) and supplies the direct current to the first charging unit 13 (normal charging). The first power transmission unit 31 includes a connector connectable to the first charging unit 13 of the moving body 10, a cable that transfers power to the connector, an AC/DC converter, an inverter, a rectifier circuit, a transformer, and a circuit breaker. The first power transmission unit 31 may be configured to supply electric power in a non-contact manner (wireless AC charging). In this case, the power feeding method may be either a magnetic field coupling method or an electric field coupling method.

The second power transmission unit 32 converts an alternating current of a predetermined voltage value (for example, 6600 V) supplied from an external AC power source into a direct current of a predetermined voltage value (for example, 500 V) and supplies the direct current to the second charging unit (quick charging). The second power transmission unit 32 includes a connector that is connectable to the second charging unit 14 of the moving body 10, a cable that transfers power to the connector, an AC/DC converter, an inverter, a rectifier circuit, a transformer, and a circuit breaker.

The communication unit 33 transmits and receives various kinds of information through communication with the moving body 10, the communication terminal 20, and the server 40 over the network NW under control of the control unit 35. The communication unit 33 is, for example, a communication module.

The recording unit 34 records various kinds of information about the charging device 30. The recording unit 34 is, for example, a DRAM, a ROM, a flash memory, or an SSD.

The control unit 35 is constituted by a memory and a processor having hardware such as a CPU. The control unit 35 controls each unit of the charging device 30.

Functional Configuration of Server

Figure 5:
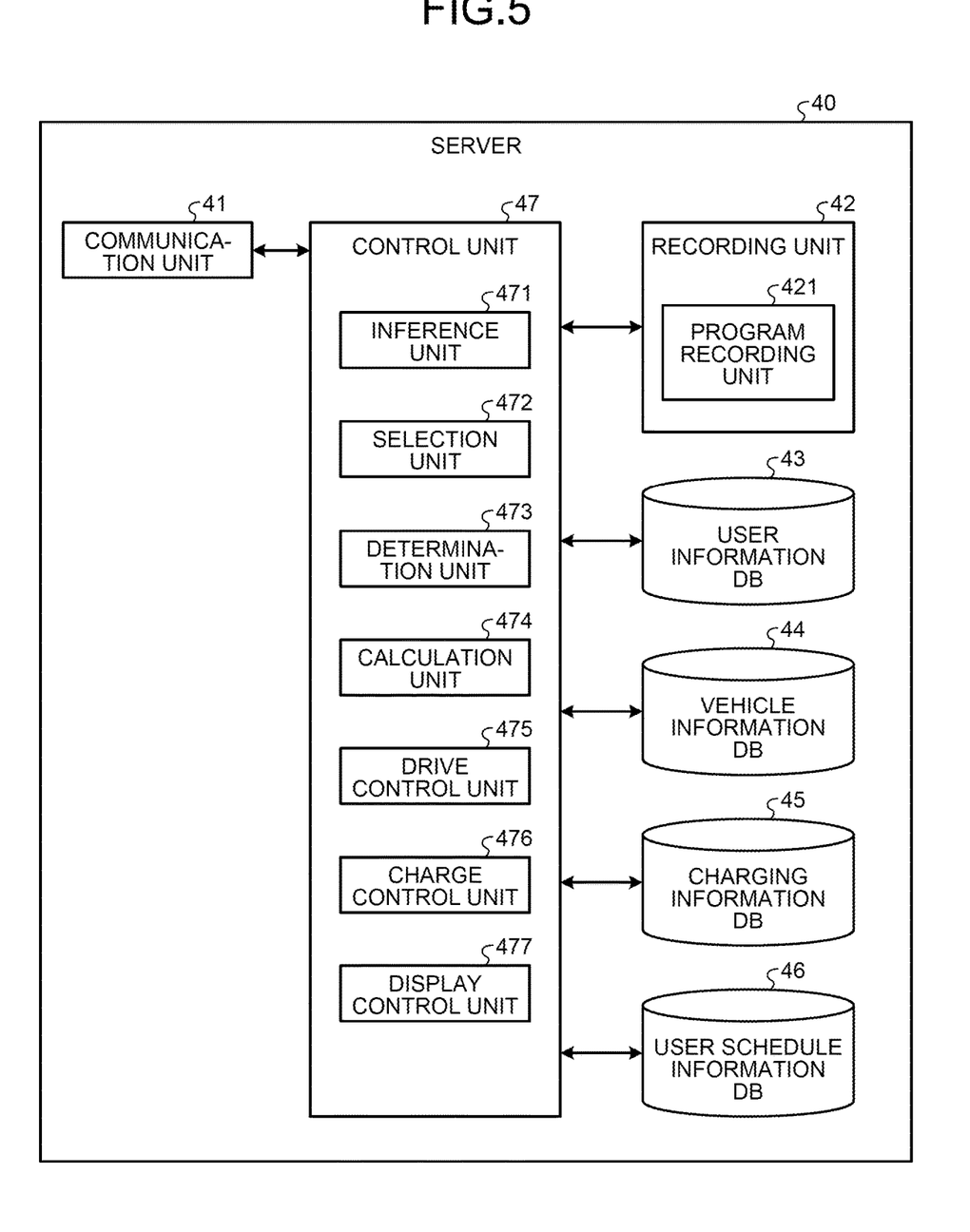
FIG. 5 is a block diagram illustrating a functional configuration of a server according to the embodiment.

Next, a functional configuration of the server 40 will be described. FIG. 5 is a block diagram illustrating the functional configuration of the server 40.

The server 40 illustrated in FIG. 5 includes a communication unit 41, a recording unit 42, a user information database 43 (hereinafter referred to as "user information DB 43"), a vehicle information database 44 (hereinafter referred to as "vehicle information DB 44"), a charging information database 45 (hereinafter referred to as "charging information DB 45"), a user schedule information database 46 (hereinafter referred to as "user schedule information DB 46"), and a control unit 47.

The communication unit 41 communicates with the moving body 10, the communication terminal 20, and the charging device 30 and transmits and receives various kinds of information over the network NW under control of the control unit 47. The communication unit 41 is, for example, a communication module.

The recording unit 42 records various kinds of information about the server 40. Further, the recording unit 42 has a program recording unit 421 that records various programs executed by the server 40. The recording unit 42 is realized by using a DRAM, a ROM, a flash memory, an SSD, an HDD, a memory card, or the like.

The user information DB 43 records user information in which terminal information for identifying the communication terminal 20 possessed by a user and user identification information for identifying the user are associated with each other. The terminal information includes a device address, a telephone number, an e-mail address, and the like. The user identification information includes a user's name, address, and date of birth and user's action history based on position information of the user's communication terminal 20. The action history may include user's purchase history based on electronic money registered in the user's communication terminal 20. The user information DB 43 is realized, for example, by an HDD or an SSD.

The vehicle information DB 44 records vehicle information in which vehicle identification information for identifying the moving body 10, current state information of the moving body 10, and current position information of the moving body 10 are associated with one another. The vehicle identification information includes vehicle model name, model year, owner, and the like of the moving body 10. The state information includes a remaining battery level of the battery 11, CAN data, and the like of the moving body 10. The vehicle information DB 44 is realized, for example, by an HDD or an SSD.

The charging information DB 45 records charging information in which charging identification information for identifying the charging device 30, charging status information indicating a current charging status of the charging device 30, and installation information indicating an installation place of the charging device 30 are associated with one another. The charging identification information includes a charging method of the charging device 30 (for example, a normal charging method (single-phase AC200 V or 100 V) or a quick charging method), a shape of a charging connector, a device address, and the like. The charging status information includes whether the moving body 10 is currently charged by the charging device 30, a scheduled charging completion time of the battery 11 of the moving body 10, a charging status of the battery 11 of the moving body 10, and the like. The charging information DB 45 is realized, for example, by an HDD or an SSD.

The user schedule information DB 46 records user schedule information in which terminal information for identifying the communication terminal 20 possessed by a user, user identification information for identifying the user, and user's schedule input by the user are associated with one another. The user's schedule includes a planned use position of the moving body 10, a user's destination, a user's scheduled use time, a date and time of user's use of the moving body 10, and the like. The user schedule information DB 46 is realized, for example, by an HDD or an SSD.

The control unit 47 is constituted by a memory and a processor having hardware such as a CPU, a field-programmable gate array (FPGA), and a graphics processing unit (GPU). The control unit 47 controls each unit of the server 40. The control unit 47 includes an inference unit 471, a selection unit 472, a determination unit 473, a calculation unit 474, a drive control unit 475, a charge control unit 476, and a display control unit 477. In one embodiment, the control unit 47 functions as a processor.

The inference unit 471 acquires respective planned use positions of plural users, respective destinations of the plural users, respective remaining battery levels of the batteries 11 of the moving bodies 10 which the plural users are scheduled to use, and respective scheduled use times of the plural users from plural communication terminals 20 over the network NW. Further, the inference unit 471 acquires position information of each of the plurality of moving bodies 10 over the network NW. Then, the inference unit 471 estimates, for each moving body 10, a required power amount of the battery 11 of the moving body 10 based on the scheduled use time and the destination. Specifically, the inference unit 471 estimates the required power amount required by the battery 11 of the moving body 10 based on a distance of a route from the user's planned use position to the destination. In this case, the inference unit 471 may estimate the required power amount required by the battery 11 of the moving body 10 by further taking into consideration the number of passengers of the moving body 10 other than the user, information on a scheduled use time at which the user is scheduled to use the moving body 10, and a traffic jam status on the route from the planned use position to the destination. The inference unit 471 may read out a learned model recorded in the program recording unit 421, input, as input data, a user's planned use position, a user's destination, and a model of the moving body 10 to the learned model, and output a required power amount as output data. This learned model is generated by using, for example, a deep neural network (DNN) as machine learning. The type of DNN network may be any type that can be used by the inference unit 471. Specifically, the type of machine learning is not limited in particular, for example, as long as teacher data and learning data in which a distance, a required power amount for this distance, and a vehicle model are associated are prepared and input to a calculation model based on a multi-layer neural network. Further, as a machine learning method, a method based on the DNN of a multi-layer neural network such as a convolutional neural network (CNN) or 3D-CNN may be used.

The selection unit 472 preferentially selects a moving body 10 whose remaining battery level of the battery 11 is close to the required power amount among a plurality of moving bodies 10 located within a predetermined region including the planned use position of the user based on respective pieces of position information of the plurality of moving bodies 10 acquired by the inference unit 471 and the remaining battery levels of the batteries 11 of the plurality of moving bodies 10. Specifically, the selection unit 472 preferentially selects a moving body 10 whose remaining battery level of the battery 11 is close to the required power amount among a plurality of moving bodies 10 located within a region, for example, 3 km or a moving range over which the user can move in 5 minutes from the planned use position of the user based on respective pieces of position information acquired from the plurality of moving bodies 10 and the remaining battery levels of the batteries 11 of the plurality of moving bodies 10.

The determination unit 473 determines, for each moving body 10, whether the remaining battery level of the battery 11 is equal to or greater than the required power amount estimated by the inference unit 471. Specifically, the determination unit 473 determines whether the remaining battery level of the battery 11 of the moving body 10 selected by the selection unit 472 is equal to or greater than the required power amount estimated by the inference unit 471. Further, the determination unit 473 determines whether a difference calculated by the calculation unit 474 is equal to or less than a predetermined value. The predetermined value is, for example, about 20% of a full charge capacity. The predetermined value can be changed as appropriate. Further, the determination unit 473 determines whether the battery 11 of the moving body 10 can be fully charged by the charging device 30 by the user's scheduled use time based on the user's scheduled use time and the remaining battery level of the battery 11 of the moving body 10. Further, the determination unit 473 determines whether the battery 11 of the moving body 10 can be charged to the required power amount by quick charging within a time from a current time to the scheduled use time when the user is scheduled to use the moving body 10. Further, the determination unit 473 determines whether the charging facility is full based on the charging information recorded in the charging information DB 45 and the charging status information acquired by the charge control unit 476.

The calculation unit 474 calculates a difference between the remaining battery level of the battery 11 and the full charge capacity of the battery 11 of the moving body 10 for each moving body whose remaining battery level of the battery 11 is equal to or greater than the required power amount estimated by the inference unit 471. Specifically, the calculation unit 474 calculates a difference between the remaining battery level of the battery 11 of the moving body 10 selected by the selection unit 472 and the full charge capacity of the battery 11 of the moving body 10. More specifically, the calculation unit 474 calculates a difference between the full charge capacity of the battery 11 of the moving body 10 selected by the selection unit 472 and the remaining battery level of the battery 11 of the moving body 10 selected by the selection unit 472 based on vehicle information recorded in the vehicle information DB 44.

The drive control unit 475 arranges or dispatches the moving body 10 determined as having a remaining battery level equal to or greater than the required power amount by the determination unit 473 (the moving body 10 whose remaining battery level satisfies the required power amount) to the user's planned use position by controlling the ECU 19 of the moving body 10 determined as having a remaining battery level equal to or greater than the required power amount by the determination unit 473 over the network NW. Further, the drive control unit 475 moves the moving body 10 determined as having a remaining battery level less than the required power amount by the determination unit 473 (the moving body 10 whose remaining battery level does not satisfy the required power amount) to a charging facility where at least one charging device 30 is installed and charges the moving body 10 by controlling the ECU 19 of the moving body 10 determined as having a remaining battery level less than the required power amount by the determination unit 473. The drive control unit 475 moves the moving body 10 that can be charged to the full charge capacity within a time from a current time to the scheduled use time to the charging facility to charge the moving body 10. The drive control unit 475 dispatches the moving body 10 whose battery 11 has been charged to the full charge capacity to the planned use position of the user.

The charge control unit 476 charges the moving body 10 that has moved to the charging facility by controlling the charging device 30 over the network NW.

The display control unit 477 outputs information indicating that the moving body 10 cannot be dispatched at the scheduled use time to the user's communication terminal 20 over the network NW.

Processing of Server

Figure 6:
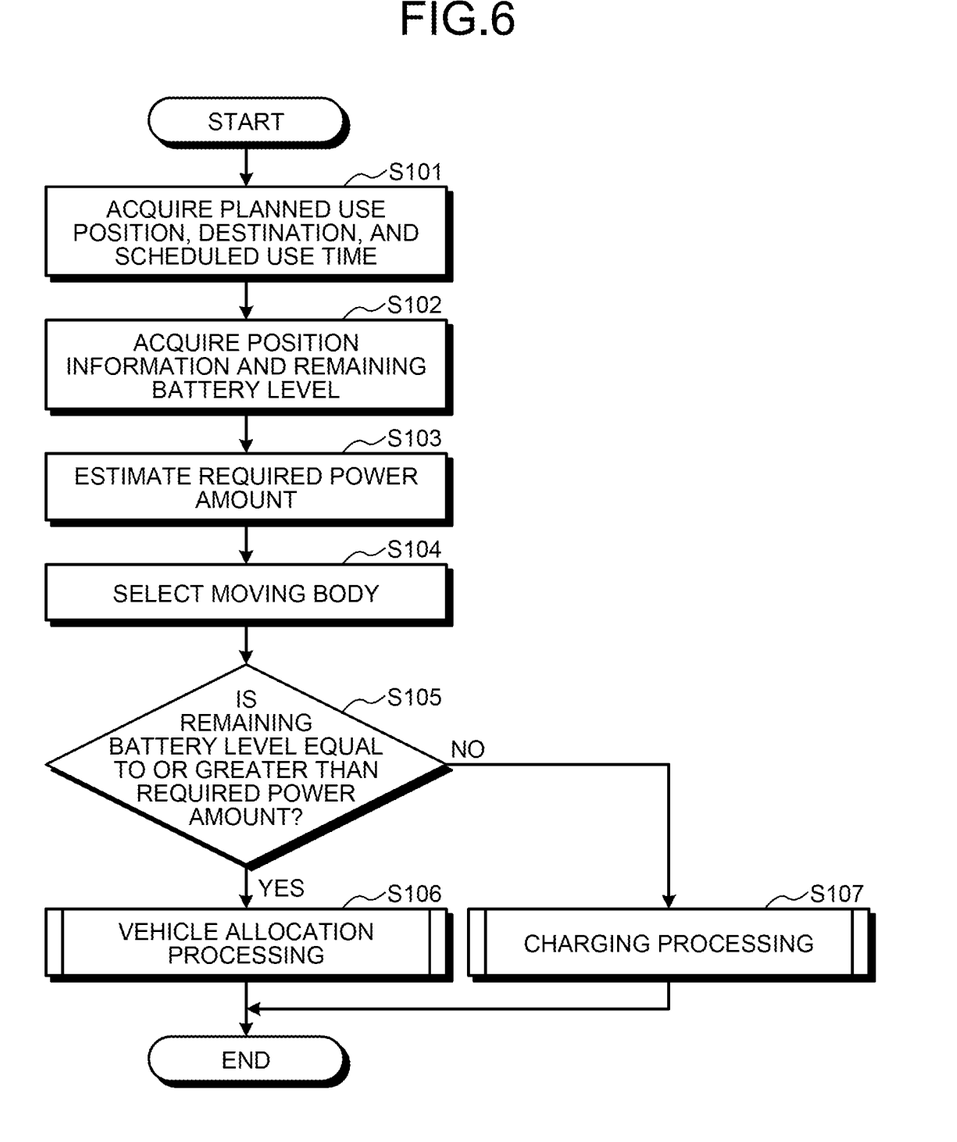
FIG. 6 is a flowchart illustrating an outline of processing executed by the server according to the embodiment.

Next, processing executed by the server 40 will be described. FIG. 6 is a flowchart illustrating an outline of the processing executed by the server 40.

As illustrated in FIG. 6, first, the inference unit 471 acquires a user's planned use position, a user's destination, and a scheduled use time from the communication terminal 20 over the network NW (step S101).

Subsequently, the inference unit 471 acquires position information indicating a current position and a remaining battery level of the battery 11 from each of the plurality of moving bodies 10 over the network NW (step S102).

Then, the inference unit 471 estimates a required power amount required by the battery 11 of the moving body 10 used for movement from the planned use position to the destination based on the user's planned use position and the destination acquired from the communication terminal 20 (step S103). Specifically, the inference unit 471 estimates the required power amount required by the battery 11 of the moving body 10 based on a distance of a route from the planned use position to the destination. In this case, the inference unit 471 may estimate the required power amount required by the battery 11 of the moving body 10 by further taking into consideration the number of passengers of the moving body 10 other than the user, information on a scheduled use time at which the user is scheduled to use the moving body 10, and a traffic jam status on the route from the planned use position to the destination.

Subsequently, the selection unit 472 preferentially selects a moving body 10 whose remaining battery level of the battery 11 is close to the required power amount among a plurality of moving bodies 10 located within a predetermined region including the user's planned use position based on the position information acquired from each of the plurality of moving bodies 10 and the remaining battery level of the battery 11 of each of the plurality of moving bodies 10 (step S104). Specifically, the selection unit 472 preferentially selects a moving body 10 whose remaining battery level of the battery 11 is close to the required power amount among a plurality of moving bodies 10 located within a region, for example, 3 km or a moving range over which the user can move in 5 minutes from the planned use position of the user based on respective pieces of position information acquired from the plurality of moving bodies 10 and the remaining battery levels of the batteries 11 of the plurality of moving bodies 10. In this case, in a case where a plurality of moving bodies 10 having the same remaining battery level of the battery 11 are located, the selection unit 472 selects a moving body 10 closest to the user's planned use position.

Then, the determination unit 473 determines whether the remaining battery level of the battery 11 of the moving body 10 selected by the selection unit 472 is equal to or greater than the required power amount (step S105). In a case where the determination unit 473 determines that the remaining battery level of the battery 11 of the moving body 10 selected by the selection unit 472 is equal to or greater than the required power amount (step S105: Yes), the server 40 proceeds to step S106, which will be described later. Meanwhile, in a case where the determination unit 473 determines that the remaining battery level of the battery 11 of the moving body 10 selected by the selection unit 472 is less than the required power amount (step S105: No), the server 40 proceeds to step S107, which will be described later.

In step S106, the drive control unit 475 performs vehicle allocation processing for dispatching the moving body 10 selected by the selection unit 472 by controlling the moving body 10 to move to the user's planned use position. Details of the vehicle allocation processing will be described later. After step S106, the server 40 finishes this processing.

In step S107, the drive control unit 475 performs charging processing for controlling the moving body 10 selected by the selection unit 472 to move to a charging facility where the charging device 30 is installed and charging the battery 11 of the moving body 10. Details of the charging processing will be described later. After step S107, the server 40 finishes this processing.

Vehicle Allocation Processing

Figure 7:
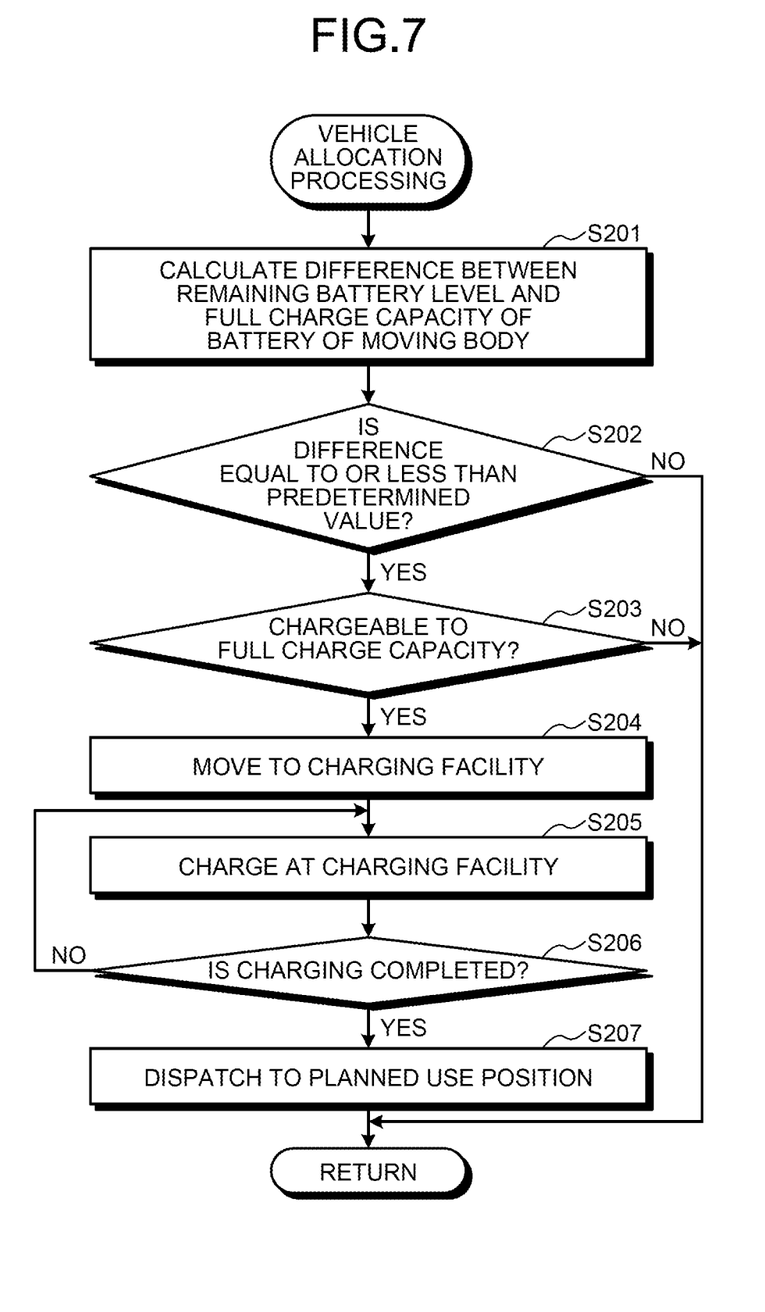
FIG. 7 is a flowchart illustrating an outline of vehicle allocation processing of FIG. 6.

Next, the vehicle allocation processing described in step S106 of FIG. 6 will be described. FIG. 7 is a flowchart illustrating an outline of the vehicle allocation processing.

As illustrated in FIG. 6, first, the calculation unit 474 calculates a difference between the remaining battery level of the battery 11 of the moving body 10 selected by the selection unit 472 and the full charge capacity of the battery 11 of the moving body 10 (step S201). Specifically, the calculation unit 474 calculates a difference between the full charge capacity of the battery 11 of the moving body 10 selected by the selection unit 472 and the remaining battery level of the battery 11 of the moving body 10 selected by the selection unit 472 based on the vehicle information recorded in the vehicle information DB 44.

The determination unit 473 determines whether the difference calculated by the calculation unit 474 is equal to or less than a predetermined value (step S202). In a case where the determination unit 473 determines that the difference calculated by the calculation unit 474 is equal to or less than the predetermined value (step S202: Yes), the server 40 proceeds to step S203, which will be described later. Meanwhile, in a case where the determination unit 473 determines that the difference calculated by the calculation unit 474 is not equal to or less than the predetermined value (step S202: No), the server 40 proceeds to step S207, which will be described later.

In step S203, the determination unit 473 determines whether the battery 11 of the moving body 10 can be charged to the full charge capacity by the charging device 30 by the user's scheduled use time based on the user's scheduled use time and the remaining battery level of the battery 11 of the moving body 10. In a case where the determination unit 473 determines that the battery 11 of the moving body 10 can be charged to the full charge capacity by the charging device 30 by the user's scheduled use time (step S203: Yes), the server 40 proceeds to step S204, which will be described later. Meanwhile, in a case where the determination unit 473 determines that the battery 11 of the moving body 10 cannot be charged to the full charge capacity by the charging device 30 by the user's scheduled use time (step S203: No), the server 40 proceeds to step S207, which will be described later.

In step S204, the drive control unit 475 moves the moving body 10 to the charging facility in which the charging device 30 is installed by controlling the ECU 19 of the moving body 10 over the network NW.

Subsequently, the charge control unit 476 charges the moving body 10 that has moved to the charging facility by controlling the charging device 30 over the network NW (step S205). As a result, the moving body 10 having a small difference between the full charge capacity and the remaining battery level of the battery 11 is preferentially charged by the charging device 30 as compared with the other moving bodies 10. This shortens a charging time, thereby preventing congestion of the moving bodies 10 charged in the charging facility.

Then, the determination unit 473 determines whether the charging of the moving body 10 by the charging device 30 has been completed (step S206). In a case where the determination unit 473 determines that the charging of the moving body 10 by the charging device 30 has been completed (step S206: Yes), the server 40 proceeds to step S207, which will be described later. Meanwhile, in a case where the determination unit 473 determines that the charging of the moving body 10 by the charging device 30 has not been completed (step S206: No), the server 40 proceeds to step S205.

In step S207, the drive control unit 475 dispatches the moving body 10 to the user's planned use position by controlling the ECU 19 of the moving body 10 over the network NW. As a result, the server 40 moves the moving body 10 that does not need to be charged to the user's planned use position, and therefore a plurality of moving bodies 10 can be efficiently charged. Further, since the user does not need to charge the moving body 10 with the charging device 30, the user can move from the planned use position to the destination by using the moving body 10. After step S207, the server 40 returns to the main routine of FIG. 6 and finishes this processing.

Charging Processing

Figure 8:
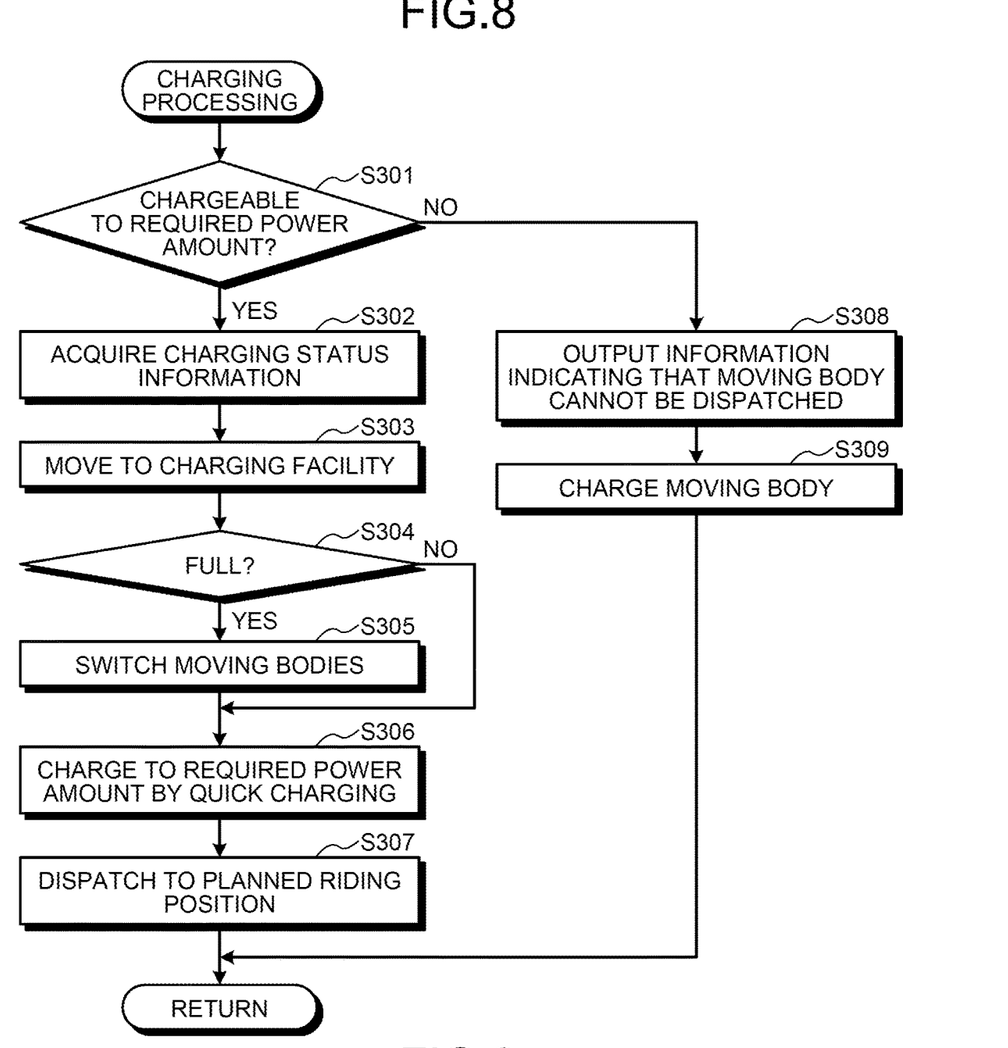
FIG. 8 is a flowchart illustrating an outline of charging processing of FIG. 6.

Next, the charging processing described in step S107 of FIG. 6 will be described. FIG. 8 is a flowchart illustrating an outline of the charging processing.

As illustrated in FIG. 8, first, the determination unit 473 determines whether charging to the required power amount can be performed by quick charging within a time from the current time to the scheduled use time at which the user is scheduled to use the moving body 10 (step S301). In a case where the determination unit 473 determines that charging to the required power amount can be performed by quick charging within the time from the current time to the scheduled use time at which the user is scheduled to use the moving body 10 (step S301: Yes), the server 40 proceeds to step S302, which will be described later. Meanwhile, in a case where the determination unit 473 determines that charging to the required power amount cannot be performed by quick charging within the time from the current time to the scheduled use time at which the user is scheduled to use the moving body 10 (step S301: No), the server 40 proceeds to step S308, which will be described later.

In step S302, the charge control unit 476 acquires charging status information indicating a charging status of the charging facility in which one or more charging devices 30 are installed over the network NW. The charging status information includes whether the moving body 10 is being charged by each charging device 30 installed in the charging facility, the remaining battery level of the battery 11 of the moving body 10 that is being charged, the number of charging devices 30 installed in the charging facility, and the like.

Subsequently, the determination unit 473 determines whether the charging facility is full based on the charging information recorded in the charging information DE 45 and the charging status information acquired by the charge control unit 476 (step S304). In a case where the determination unit 473 determines that the charging facility is full (step S304: Yes), the server 40 proceeds to step S305, which will be described later. Meanwhile, in a case where the determination unit 473 determines that the charging facility is not full (step S304: No), the server 40 proceeds to step S306, which will be described later.

In step S305, the drive control unit 475 replaces the moving body 10 that is being charged by the charging device 30 with the moving body 10 whose remaining battery level of the battery 11 is less than the required power amount that has moved to the charging facility by controlling the ECU 19 of the moving body 10 that is being charged in the charging facility and the ECU 19 of the moving body 10 whose remaining battery level of the battery 11 is less than the required power amount over the network NW.

In step S306, the charge control unit 476 charges the moving body 10 to the required power amount by quick charging by controlling the charging device 30 over the network NW. In this case, in a case where a plurality of moving bodies 10 are located around the charging device, the charge control unit 476 quick-charges the moving body 10 whose remaining battery level of the battery 11 is less than the required power amount by the charging device 30 in the charging facility in descending order of a difference between the remaining battery level of the battery 11 and the required power amount. As a result, even in a case where the charging facility is full, it is possible to dispatch the moving body 10 whose remaining battery level is equal to or greater than the required power amount (the moving body 10 that satisfies the required power amount) by the user's scheduled use time, and it is therefore possible to efficiently charge a plurality of moving bodies 10. As a result, the moving body 10 can charge the battery 11 with the required power amount by the scheduled riding time at which the user is scheduled to ride on the moving body 10.

Subsequently, the drive control unit 475 dispatches the moving body 10 that has been charged to the required power amount by quick charging using the charging device 30 to the user's planned use position over the network NW (step S307). After step S307, the server 40 returns to the main routine of FIG. 6 and finishes this processing.

Figure 9:
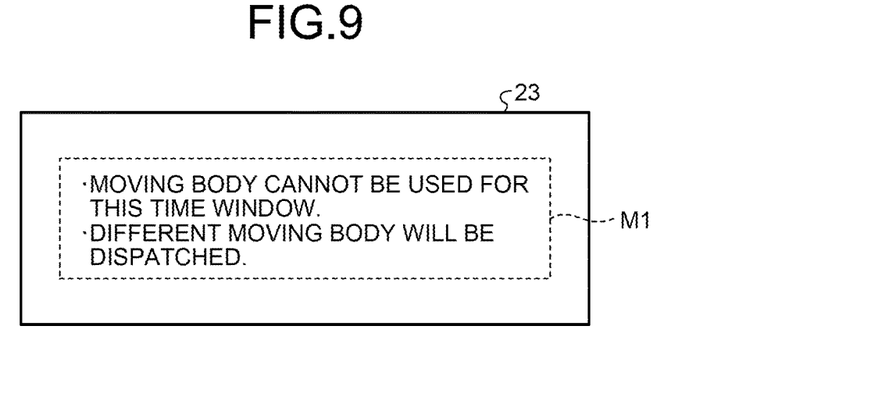
FIG. 9 is a diagram illustrating an example of an image displayed by the communication terminal according to the embodiment.

In step S308, the display control unit 477 outputs information indicating that the moving body 10 cannot be dispatched at the scheduled use time to the user's communication terminal 20 over the network NW. In this case, as illustrated in FIG. 9, the display unit 23 of the communication terminal 20 displays a message M1 corresponding to the information indicating that the moving body 10 cannot be dispatched at the scheduled use time received from the server 40. As a result, the user can know that the moving body 10 is unavailable at the desired time.

Subsequently, the drive control unit 475 moves the moving body 10 to the charging facility and charges the moving body 10 by controlling the ECU 19 of the moving body 10 over the network NW (step S309). After step S309, the server 40 returns to the main routine of FIG. 6 and finishes this processing.

According to the embodiment described above, the control unit 47 acquires respective planned use positions of plural users, respective destinations of the plural users, and remaining battery levels of the rechargeable batteries 11 of the moving bodies 10 which the plural users are scheduled to use (ride on). Then, the control unit 47 estimates, for each moving body 10, the required power amount of the battery 11 of the moving body 10 based on the user's planned use position and the user's destination and determines, for each moving body 10, whether the remaining battery level of the battery 11 is equal to or greater than the required power amount. Then, the control unit 47 dispatches the moving body 10 whose remaining battery level of the battery 11 is equal to or greater than the required power amount to the user's planned use position, and therefore it is possible to efficiently charge a plurality of moving bodies 10.

Further, according to the embodiment, the control unit 47 moves the moving body 10 whose remaining battery level of the battery 11 is less than the required power amount to a charging facility in which one or more charging devices 30 are installed to charge the moving body 10, and therefore it is possible to prevent the moving body 10 that does not need to be charged from being charged by the charging device 30.

Further, according to the embodiment, the control unit 47 determines whether a difference is equal to or less than a predetermined value for each moving body 10 whose remaining battery level of the battery 11 is equal to or greater than the required power amount, and determines, for each moving body 10 for which the difference is equal to or less than the predetermined value, whether charging to a full charge capacity can be performed within a time from a current time to a user's scheduled use time. Then, the control unit 47 moves the moving body 10 that can be charged to the full charge capacity within the time from the current time to the scheduled use time to the charging facility where the charging device 30 is installed to charge the moving body 10, and dispatches the moving body 10 that has been charged to the full charge capacity to a user's planned use position. As a result, the moving body 10 having a small difference between the full charge capacity and the remaining battery level of the battery 11 is preferentially charged by the charging device 30 as compared with the other moving bodies 10. This shortens a charging time, thereby preventing congestion of the moving bodies 10 charged in the charging facility.

Further, according to the embodiment, the control unit 47 determines, for each moving body 10 whose remaining battery level of the battery 11 is less than the required power amount, whether the moving body 10 can be charged to the required power amount by quick charging within a time from a current time to a user's scheduled use time and moves the moving body 10 that can be charged to the required power amount by quick charging to the charging facility. Then, the control unit 47 charges the moving body 10 that can be charged to the required power amount by quick charging to the required power amount by quick charging in the charging facility where the charging device 30 is installed, and dispatches the moving body 10 that has been charged to the required power amount to the user's planned use position. As a result, even in a case where the remaining battery level of the moving body 10 is not equal to nor greater than the required power amount (the remaining battery level of the moving body 10 is less than the required power amount), it is possible to dispatch the moving body 10 whose remaining battery level is equal to or greater than the required power amount by the user's scheduled use time. It is therefore possible to efficiently charge a plurality of moving bodies 10 and prevent a power shortage due to the charging device 30.

Further, according to the embodiment, the control unit 47 acquires the charging status information indicating a current charging status of the charging device 30 installed in the charging facility, and determines whether the charging facility is full based on the charging status information. Then, in a case where the charging facility is full, the control unit 47 replaces the moving body 10 that is being charged in the charging facility with the moving body 10 whose remaining battery level of the battery 11 is less than the required power amount, and charges the moving body 10 whose remaining battery level of the battery 11 is less than the required power amount by quick charging in the charging facility. Therefore, even in a case where the charging facility is full, it is possible to dispatch the moving body 10 whose remaining battery level is equal to or greater than the required power amount by the user's scheduled use time, and therefore it is possible to efficiently charge a plurality of moving bodies 10.

Further, according to the embodiment, the control unit 47 calculates a difference between the remaining battery level of the battery 11 and the required power amount for each moving body 10 whose remaining battery level of the battery 11 is less than the required power amount. Then, the control unit 47 quick-charges the moving body 10 whose remaining battery level of the battery 11 is less than the required power amount by the charging device 30 in the charging facility in descending order of the difference between the remaining battery level of the battery 11 and the required power amount. As a result, even in a case where the charging facility is full, it is possible to dispatch the moving body 10 whose remaining battery level is equal to or greater than the required power amount by the user's scheduled use time, and therefore it is possible to efficiently charge a plurality of moving bodies 10.

Further, according to the embodiment, in a case where a plurality of moving bodies 10 are present within a predetermined region including a user's planned use position, the control unit 47 preferentially dispatches the moving body 10 whose remaining battery level of the battery 11 is close to the required power amount among the plurality of moving bodies 10. Therefore, since the moving body 10 that does not require charging of the battery 11 is dispatched, the number of moving bodies 10 in the charging facility can be reduced.

Other Embodiments

Further, in the charging system according to the embodiment, "unit" can be read as "circuit" or the like. For example, the control unit can be read as a control circuit.

The program to be executed by the charging system according to the embodiment is offered as a file data in an installable format or an executable format by being recorded in a computer-readable recording medium such as a CD-ROM, a CD-R, a digital versatile disk (DVD), a USB medium, or a flash memory.

Further, the program to be executed by the charging system according to the embodiment may be offered by being stored in a computer connected to a network such as the Internet and downloaded over a network.

In the description of the flowcharts in the present specification, the order of processes in steps has been explained by using expressions such as "first", "then", and "subsequently", but the order of processes necessary for implementing the present embodiment is not uniquely defined by these expressions. That is, the order of processes in the flowchart described in the present specification can be changed unless inconsistency occurs.

According to an embodiment, it is possible to obtain an effect that a plurality of moving bodies can be efficiently charged.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server comprising a processor configured to:
   acquire respective planned use positions of plural users, respective destinations of the plural users, and remaining battery levels of rechargeable batteries of moving bodies which the plural users are scheduled to use,
   estimate, for each of the moving bodies, a required power amount of the battery based on the planned use position and the destination,
   determine, for each of the moving bodies, whether the remaining battery level is equal to or greater than the required power amount,
   dispatch the moving body whose remaining battery level is equal to or greater than the required power amount to the planned use position,
   move the moving body whose remaining battery level is less than the required power amount to a charging facility where one or more charging devices are installed to charge the moving body,
   acquire scheduled use times at which the plural users are scheduled to use the moving bodies,
   calculate a difference between the remaining battery level and a full charge capacity of the battery for each moving body whose remaining battery level is equal to or greater than the required power amount,
   determine whether the difference is equal to or less than a predetermined value for each moving body whose remaining battery level is equal to or greater than the required power amount,
   determine, for each moving body for which the difference is equal to or less than the predetermined value, whether the moving body is chargeable to the full charge capacity within a time from a current time to the scheduled use time,
   move the moving body that is chargeable to the full charge capacity within the time from the current time to the scheduled use time to the charging facility to charge the moving body,
   dispatch the moving body that has been charged to the full charge capacity to the planned use position,
   determine, for each moving body whose remaining battery level is less than the required power amount, whether the moving body is chargeable to the required power amount by charging using a direct current within the time from the current time to the scheduled use time,
   move the moving body that is chargeable to the required power amount by charging using the direct current to the charging facility,
   charge, using the direct current, the moving body that is chargeable to the required power amount by charging using the direct current to the required power amount in the charging facility, and
   dispatch the moving body that has been charged to the required power amount to the planned use position.

2. The server according to claim 1, wherein the processor is configured to
   acquire charging status information indicating a current charging status of the charging devices installed in the charging facility,
   determine whether the charging facility is full based on the charging status information,
   replace the moving body that is being charged in the charging facility with the moving body whose remaining battery level is less than the required power amount in a case where the charging facility is full, and
   charge the moving body whose remaining battery level is less than the required power amount to the required power amount by charging using the direct current in the charging facility.

3. The server according to claim 2, wherein the processor is configured to
   calculate a difference between the remaining battery level and the required power amount for each moving body whose remaining battery level is less than the required power amount, and
   charge, using the direct current, the moving bodies whose remaining battery levels are less than the required power amount in the charging facility in descending order of the difference.

4. The server according to claim 1, wherein the processor is configured to,
   in a case where there are a first moving body and a second moving body within a predetermined region including the planned use position, preferentially dispatch the first moving body whose remaining battery level is closer to the required power amount as compared to a remaining battery level of the second moving body.

5. A charging system comprising:
   a plurality of moving bodies each including a rechargeable battery; and
   a server having a processor configured to
      acquire respective planned use positions of plural users, respective destinations of the plural users, and remaining battery levels of the batteries of the plurality of moving bodies which the plural users are scheduled to use,
      estimate, for each of the moving bodies, a required power amount of the battery based on the planned use position and the destination,
      determine, for each of the moving bodies, whether the remaining battery level is equal to or greater than the required power amount,
      dispatch the moving body whose remaining battery level is equal to or greater than the required power amount to the planned use position, move the moving body whose remaining battery level is less than the required power amount to a charging facility where one or more charging devices are installed to charge the moving body, acquire scheduled use times at which the plural users are scheduled to use the moving bodies, calculate a difference between the remaining battery level and a full charge capacity of the battery for each moving body whose remaining battery level is equal to or greater than the required power amount, determine whether the difference is equal to or less than a predetermined value for each moving body whose remaining battery level is equal to or greater than the required power amount, determine, for each moving body for which the difference is equal to or less than the predetermined value, whether the moving body is chargeable to the full charge capacity within a time from a current time to the scheduled use time, move the moving body that is chargeable to the full charge capacity within the time from the current time to the scheduled use time to the charging facility to charge the moving body, dispatch the moving body that has been charged to the full charge capacity to the planned use position, determine, for each moving body whose remaining battery level is less than the required power amount, whether the moving body is chargeable to the required power amount by charging using a direct current within the time from the current time to the scheduled use time, move the moving body that is chargeable to the required power amount by charging using the direct current to the charging facility, charge, using the direct current, the moving body that is chargeable to the required power amount by charging using the direct current to the required power amount in the charging facility, and dispatch the moving body that has been charged to the required power amount to the planned use position.

6. The charging system according to claim 5, wherein the processor is configured to acquire charging status information indicating a current charging status of the charging devices installed in the charging facility, determine whether the charging facility is full based on the charging status information, replace the moving body that is being charged in the charging facility with the moving body whose remaining battery level is less than the required power amount in a case where the charging facility is full, and charge the moving body whose remaining battery level is less than the required power amount to the required power amount by charging using the direct current in the charging facility.

7. The charging system according to claim 6, wherein the processor is configured to calculate a difference between the remaining battery level and the required power amount for each moving body whose remaining battery level is less than the required power amount, and charge, using the direct current, the moving bodies whose remaining battery levels are less than the required power amount in the charging facility in descending order of the difference.

8. The charging system according to claim 5, wherein the processor is configured to, in a case where there are a plurality of moving bodies within a predetermined region including the planned use position, preferentially dispatch the moving body whose remaining battery level is equal to or greater than the required power amount among the plurality of moving bodies.

9. A non-transitory computer-readable recording medium storing a program for causing a processor to acquire respective planned use positions of plural users, respective destinations of the plural users, and remaining battery levels of rechargeable batteries of moving bodies which the plural users are scheduled to use, estimate, for each of the moving bodies, a required power amount of the battery based on the planned use position and the destination, determine, for each of the moving bodies, whether the remaining battery level is equal to or greater than the required power amount, dispatch the moving body whose remaining battery level is equal to or greater than the required power amount to the planned use position;

move the moving body whose remaining battery level is less than the required power amount to a charging facility where one or more charging devices are installed to charge the moving body;

acquire scheduled use times at which the plural users are scheduled to use the moving bodies, calculate a difference between the remaining battery level and a full charge capacity of the battery for each moving body whose remaining battery level is equal to or greater than the required power amount, determine whether the difference is equal to or less than a predetermined value for each moving body whose remaining battery level is equal to or greater than the required power amount, determine, for each moving body for which the difference is equal to or less than the predetermined value, whether the moving body is chargeable to the full charge capacity within a time from a current time to the scheduled use time, move the moving body that is chargeable to the full charge capacity within the time from the current time to the scheduled use time to the charging facility to charge the moving body, dispatch the moving body that has been charged to the full charge capacity to the planned use position, determine, for each moving body whose remaining battery level is less than the required power amount, whether the moving body is chargeable to the required power amount by charging using a direct current within the time from the current time to the scheduled use time, move the moving body that is chargeable to the required power amount by charging using the direct current to the charging facility, charge, using the direct current, the moving body that is chargeable to the required power amount by charging using the direct current to the required power amount in the charging facility, and dispatch the moving body that has been charged to the required power amount to the planned use position.

10. The non-transitory computer-readable recording medium according to claim 9 storing the program for causing the processor to acquire charging status information indicating a current charging status of the charging devices installed in the charging facility, determine whether the charging facility is full based on the charging status information, replace the moving body that is being charged in the charging facility with the moving body whose remaining battery level is less than the required power amount in a case where the charging facility is full, and charge the moving body whose remaining battery level is less than the required power amount to the required power amount by charging using the direct current in the charging facility.

11. The non-transitory computer-readable recording medium according to claim 10 storing the program for causing the processor to calculate a difference between the remaining battery level and the required power amount for each moving body whose remaining battery level is less than the required power amount, and charge, using the direct current, the moving bodies whose remaining battery levels are less than the required power amount in the charging facility in descending order of the difference.

\* \* \* \* \*